(12) United States Patent
Chen et al.

(10) Patent No.: US 10,555,268 B2
(45) Date of Patent: Feb. 4, 2020

(54) ESTABLISHING WIRELESS CONNECTIONS WITH MULTI-RADIO DEVICE

(71) Applicants: Beijing Lenovo Software Ltd., Beijing (CN); Lenovo (Beijing) Limited, Beijing (CN)

(72) Inventors: Zhijun Chen, Beijing (CN); Gaofeng Lin, Beijing (CN); Liming Wang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 44 days.

(21) Appl. No.: 14/863,888

(22) Filed: Sep. 24, 2015

(65) Prior Publication Data

US 2016/0366714 A1    Dec. 15, 2016

(30) Foreign Application Priority Data

Jun. 12, 2015    (CN) .......................... 2015 1 0325209

(51) Int. Cl.
*H04W 52/28*    (2009.01)
*H04L 29/06*    (2006.01)

(52) U.S. Cl.
CPC ........... *H04W 52/285* (2013.01); *H04L 63/08* (2013.01)

(58) Field of Classification Search
None
See application file for complete search history.

(56) References Cited

U.S. PATENT DOCUMENTS

| 2011/0059762 A1* | 3/2011 | Jones, IV | H04W 52/283 455/522 |
| 2013/0178160 A1* | 7/2013 | Wang | H04W 48/10 455/41.2 |

(Continued)

FOREIGN PATENT DOCUMENTS

| CN | 101206479 A | 6/2008 |
| CN | 102498741 A | 6/2012 |

(Continued)

OTHER PUBLICATIONS

"Chinese Application No. 201510325209.X, Office Action dated Jan. 2, 2018", w/ English Translation, (dated Jan. 2, 2018), 12 pgs.

*Primary Examiner* — Mohamed A Kamara
*Assistant Examiner* — Saad Khawar
(74) *Attorney, Agent, or Firm* — Schwegman Lundberg & Woessner, P.A.

(57) ABSTRACT

A data processing method applied to an electronic device is provided. The data processing method includes: establishing, by a first transceiver of a first electronic device; a first wireless connection with a second electronic device; positioning the second electronic device based on the first wireless connection, so as to obtain position information of the second electronic device; adjusting a transmission parameter of a second transceiver of the first electronic device to transmit a second wireless signal, so that the second transceiver transmits the second wireless signal to the second electronic device in a predetermined way; and establishing a second wireless connection with the second electronic device by the first electronic device based on the second wireless signal, a type of the second wireless connection being different from that of the first wireless connection.

8 Claims, 3 Drawing Sheets

(56) References Cited

U.S. PATENT DOCUMENTS

| | | | | |
|---|---|---|---|---|
| 2014/0148107 A1* | 5/2014 | Maltsev | ............ | H04B 1/02 |
| | | | | 455/91 |
| 2014/0218236 A1* | 8/2014 | Sadeghi | ............ | H04W 16/28 |
| | | | | 342/367 |
| 2014/0286321 A1* | 9/2014 | Balian | ............ | H04W 12/06 |
| | | | | 370/338 |
| 2016/0198400 A1* | 7/2016 | Cho | ............ | H04W 8/08 |
| | | | | 370/328 |
| 2016/0212572 A1* | 7/2016 | Tang | ............ | H04W 8/005 |
| 2016/0234634 A1* | 8/2016 | Rasband | ............ | H04W 4/02 |
| 2017/0223579 A1* | 8/2017 | Lee | ............ | H04W 48/14 |

FOREIGN PATENT DOCUMENTS

| | | |
|---|---|---|
| CN | 103119869 A | 5/2013 |
| CN | 103458493 A | 12/2013 |

\* cited by examiner

ESTABLISHING WIRELESS CONNECTIONS WITH MULTI-RADIO DEVICE

CROSS-REFERENCE TO RELATED APPLICATION(S)

This application claims priority to the Chinese Patent Application No. 201510325209.X, filed on Jun. 12, 2015; which is incorporated herein by reference in its entirety.

TECHNICAL FIELD

The present disclosure relates to a wireless data communication technique, and in particular, to a data processing method and an electronic device.

BACKGROUND

Accessing a network via a wireless router is one of the most popular network access methods. However, since the wireless router needs to transmit wireless signals continuously, and a user is close to the wireless router being used, such as the wireless router indoors, the wireless signals transmitted by the wireless router will affect the user's health to some extent.

SUMMARY

In view of the foregoing, embodiments of the present disclosure provide a data processing method and an electronic device.

In a first aspect of the present disclosure, a data processing method applied to a first electronic device is provided. The method comprises:

establishing, by a first transceiver of the first electronic device, a first wireless connection with a second electronic device;

positioning the second electronic device based on the first wireless connection, so as to obtain position information of the second electronic device;

adjusting transmission parameters of the second transceiver of the first electronic device to transmit a second wireless signal based on the position information of the second electronic device, so that the second transceiver transmits the second wireless signal to the second electronic device in a predetermined way; and establishing a second wireless connection with the second electronic device by the first electronic device based on the second wireless signal, a type of the second wireless connection being different from that of the first wireless connection.

In a second aspect of the present disclosure, an electronic device is provided. The electronic device, comprises a first transceiver, a positioning unit, an adjusting unit and a second transceiver, wherein the first transceiver is configured to transmit and/or receive a first wireless signal, and to establish a first wireless connection with a second electronic device based on the first wireless signal;

the positioning unit is configured to position the second electronic device based on the first wireless connection, so as to obtain position information of the second electronic device;

the adjusting unit is configured to adjust transmission parameters of the second transceiver to transmit a second wireless signal based on the position information of the second electronic device, so that the second transceiver transmits the second wireless signal to the second electronic device in a predetermined way; and the second transceiver is configured to transmit the second wireless signal, and to establish a second wireless connection with the second electronic device based on the second wireless signal, a type of the second wireless connection being different from that of the first wireless connection.

DETAILED DESCRIPTION

Figure 1:
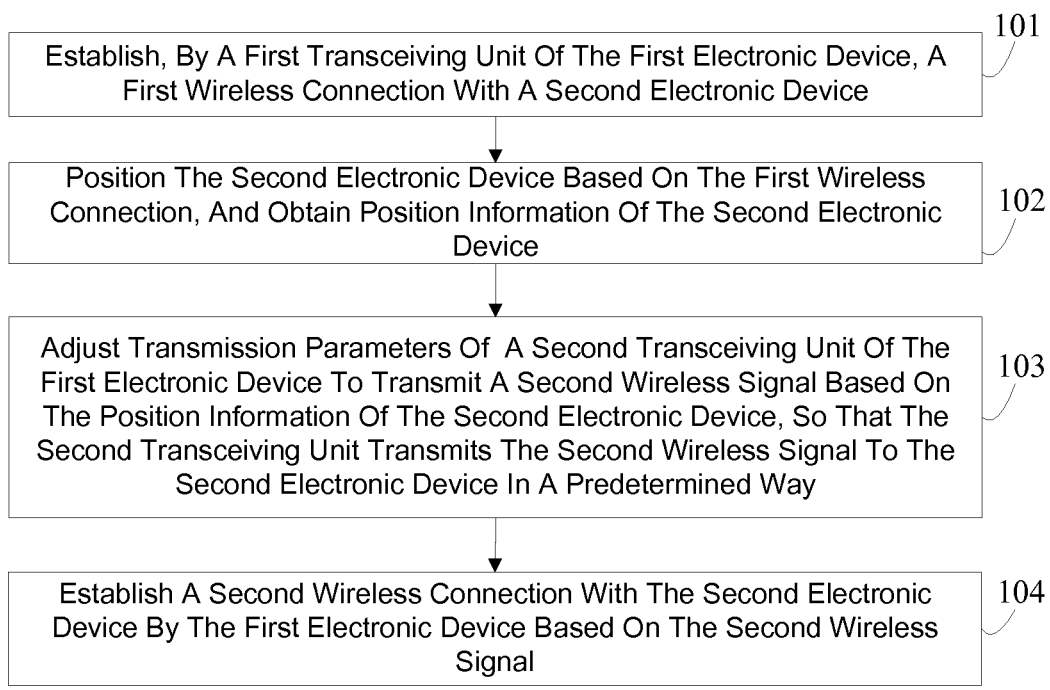
FIG. 1 is an illustrative flowchart of a data processing method according to a first embodiment of the present disclosure.

Technical solutions of the embodiments of the present disclosure are implemented as follows.

A data processing method applied to a first electronic device, comprising:

establishing, by a first transceiver of the first electronic device, a first wireless connection with a second electronic device;

positioning the second electronic device based on the first wireless connection, so as to obtain position information of the second electronic device;

adjusting transmission parameters of the second transceiver of the first electronic device to transmit a second wireless signal based on the position information of the second electronic device, so that the second transceiver transmits the second wireless signal to the second electronic device in a predetermined way; and establishing a second wireless connection with the second electronic device by the first electronic device based on the second wireless signal, a type of the second wireless connection being different from that of the first wireless connection.

As one of implementations, the step of adjusting the transmission parameters of the second transceiver of the first electronic device to transmit the second wireless signal based on the position information of the second electronic device so that the second transceiver transmits the second wireless signal to the second electronic device in the predetermined way comprises:

adjusting a transmission power and a transmission direction of the second wireless signal transmitted by the second transceiver of the first electronic device based on the position information of the second electronic device, so that the second wireless signal propagates along an azimuth angle of the second electronic device relative to the first electronic device, and covers the second electronic device.

As one of implementations, a maximum transmission power of the first transceiver is less than that of the second transceiver; and a signal transmitting and/or receiving mechanism of the first transceiver is different from that of the second transceiver.

As one of implementations, the step of establishing, by the first transceiver of the first electronic device, the first wireless connection with the second electronic device comprises:

authenticating an identity of the second electronic device after the first transceiver detects an access request transmitted by the second electronic device, and establishing the first wireless connection after the identity of the second electronic device is authenticated; or transmitting identification information of the first electronic device to the second electronic device after the first transceiver detects an access request transmitted by the second electronic device, wherein the second electronic device authenticates an identity of the first electronic device based on the identification information of the first electronic device, and establishes the first wireless connection after the identity of the first electronic device is authenticated.

As one of implementations, after the first wireless connection is established, the method further comprises:

authenticating, by the first electronic device, the identity of the second electronic device for the second wireless connection based on the first wireless connection; and adjusting the transmission parameters of the second transceiver of the first electronic device to transmit the second wireless signal after the identity of the second electronic device is authenticated, so that the second transceiver transmits the second wireless signal to the second electronic device in the predetermined way.

An electronic device, comprising a first transceiver, a positioning unit, an adjusting unit and a second transceiver, wherein the first transceiver is configured to transmit and/or receive a first wireless signal, and to establish a first wireless connection with a second electronic device based on the first wireless signal;

the positioning unit is configured to position the second electronic device based on the first wireless connection, so as to obtain position information of the second electronic device;

the adjusting unit is configured to adjust transmission parameters of the second transceiver to transmit a second wireless signal based on the position information of the second electronic device, so that the second transceiver transmits the second wireless signal to the second electronic device in a predetermined way; and the second transceiver is configured to transmit the second wireless signal, and to establish a second wireless connection with the second electronic device based on the second wireless signal, a type of the second wireless connection being different from that of the first wireless connection.

As one of implementations, the adjusting unit is further configured to adjust a transmission power and a transmission direction of the second wireless signal transmitted by the second transceiver based on the position information of the second electronic device, so that the second wireless signal propagates along an azimuth angle of the second electronic device relative to the first electronic device, and covers the second electronic device.

As one of implementations, a maximum transmission power of the first transceiver is less than that of the second transceiver; and a signal transmitting and/or receiving mechanism of the first transceiver is different from that of the second transceiver.

As one of implementations, the first transceiver is further configured to authenticate an identity of the second electronic device after detecting an access request transmitted by the second electronic device, and to establish the first wireless connection after the identity of the second electronic device is authenticated; or the first transceiver is further configured to transmit identification information of the electronic device to the second electronic device after detecting an access request transmitted by the second electronic device, wherein the second electronic device authenticates an identity of the electronic device based on the identification information of the electronic device, and establishes the first wireless connection after the identity of the electronic device is authenticated.

As one of implementations, the electronic device further comprises:

an authentication unit, configured to authenticate the identity of the second electronic device for the second wireless connection based on the first wireless connection; and to trigger the adjusting unit to adjust the transmission parameters of the second transceiver to transmit the second wireless signal after the identity of the second electronic device is authenticated, so that the second transceiver transmits the second wireless signal to the second electronic device in the predetermined way.

In the embodiments of the present disclosure, the two wireless access-enabled electronic devices firstly connects wirelessly by the first wireless connection way; the accessing second electronic device is positioned based on the first wireless connection; the second connection is established between the first electronic device and the second electronic device, based on the position information of the second electronic device; and the transmission direction of the wireless signal on the second connection is kept towards the second electronic device and the transmission power of the wireless signal is kept at a reasonable level, so as to affect the user at a minimum degree.

The present disclosure is described in detail in conjunction with the drawings and particular embodiments, in order to understand features and technical content of the present disclosure in detail. The drawings are used for reference, but not for any limitation.

FIG. 1 is an illustrative flowchart of a data processing method according to a first embodiment of the present disclosure.

As shown in FIG. 1, in step 101, the first electronic device establishes a first wireless connection with a second electronic device by a first transceiver of the first electronic device.

In the embodiment of the present disclosure, the first electronic device is an electronic device, such as a router having a radio access function, e.g. a wireless router commonly used today etc. The second electronic device is a user terminal which accesses to the first electronic device wirelessly, such as a mobile terminal, a tablet, a game machine etc.

Each of the first electronic device and the second electronic device is provided with a wireless transceiver for transmitting wireless signals and receiving wireless signals transmitted from other electronic devices. In the embodiment of the present disclosure, each of the first electronic device and the second electronic device is provided with at least two wireless transceivers for supporting at least two radio access approaches.

In step 101, the first electronic device establishes the first wireless connection with the second electronic device by the first transceiver disposed on the first electronic device itself. In the embodiment of the present disclosure, the first wireless connection may be a Bluetooth wireless connection. Power consumption of the Bluetooth wireless connection is relatively low, and coverage of its wireless signal is smaller, but the wireless signal has a less effect on health of the user of the electronic device. Accordingly, the first transceiver may be a Bluetooth antenna system.

In the embodiment of the present disclosure, the Bluetooth connection is only an example of the first wireless connection, but should not be understood as any limitation on the first wireless connection. The first wireless connection may be any of wireless connection approaches.

In step 102, the position of the second electronic device is determined based on the first wireless connection, and position information of the second electronic device is obtained.

After the first electronic device establishes the first wireless connection with the second electronic device by the first transceiver, the second electronic device will be positioned. Particularly, the second electronic device may be positioned using at least one of approaches as follows:

The first transceiver receives the first wireless signal transmitted by the first transceiver of the second electronic device, calculates transmission power of the first wireless signal, and determine a distance between the first electronic device and the second electronic device according to the calculated transmission power; or the first transceiver receives a third wireless signal transmitted by the second electronic device, calculates a time difference between the timing of transmitting the third wireless signal from the second electronic device and the timing of receiving the third wireless signal by the first transceiver, and determines a distance between the first electronic device and the second electronic device according to the time difference; and The first transceiver receives a fourth wireless signal transmitted from the second electronic device, determines a received angle of the fourth wireless signal, and takes the received angle of the fourth wireless signal as an azimuth angle of the second electronic device relative to the first electronic device.

In the embodiment of the present disclosure, the azimuth angle of the second electronic device relative to the first electronic device is determined by a transmission direction of the wireless signal between the first electronic device and the second electronic device; the distance between the first electronic device and the second electronic device is calculated by an attenuation degree of the transmission power of the wireless signal between the first electronic device and the second electronic device; or the distance between the first electronic device and the second electronic device is calculated by calculating a time delay of the wireless signal between the first electronic device and the second electronic device. It should be noted that the methods of calculating the distance and the azimuth angle between the first electronic device and the second electronic device are easy to be implemented, and thus the description thereof will be omitted here for simplicity.

In step 103, transmission parameters of the second transceiver of the first electronic device to transmit a second wireless signal is adjusted based on the position information of the second electronic device, so that the second transceiver transmits the second wireless signal to the second electronic device in a predetermined way In the embodiment of the present disclosure, after the first electronic device establishes the first wireless connection with the second electronic device by the first transceiver, the second wireless connection will be started to establish. In the embodiment of the present disclosure, the second wireless connection may be a WIFI connection. Since the transmission power of a WIFI wireless signal is relatively strong, and the wireless router is generally used in home, the WIFI wireless signal may affect the health of the user to a certain extent. According to the embodiment of the present disclosure, a Bluetooth connection with the accessing electronic device is firstly established by the wireless router; the position information of the second electronic device is determined by the Bluetooth connection; the first electronic device transmits a specific wireless signal to the second electronic device according to the position information of the second electronic device, so that the transmitted wireless signal may be directed to the second electronic device and may cover the second electronic device. The wireless signal of the second transceiver does not cover other orientations than that of the second electronic device. Therefore, when the user of the second electronic device performs a network accesses using WIFI, the WIFI wireless signal is only transmitted towards the second electronic device, but is not radiated in all directions. In addition, in the embodiment of the present disclosure, when the position of the second electronic device is determined, signal strength of the second wireless signal transmitted to the second electronic device may not be of the maximum transmission power, as long as it can cover the second electronic device. Therefore, the transmission strength of the WIFI wireless signal is significantly reduced, and thus less amount of radiation is received by the electronic device, which thereby ensures the user's health.

In the embodiment of the present disclosure, the transmission parameters of the second transceiver to transmit the wireless signal may be adjusted by determining the position information of the second electronic device, ensuring that the second wireless signal is transmitted towards the second electronic device, and the transmission range of the second wireless signal can cover the second electronic device.

In step 104, the first electronic device establishes a second wireless connection with the second electronic device by the first electronic device based on the second wireless signal. The type of the second wireless connection is different from that of the first wireless connection.

In the embodiment of the present disclosure, after the second electronic device receives the second wireless signal transmitted by the second transceiver, the second electronic device establishes the second wireless connection with the first electronic device. The second wireless connection may be a WIFI wireless connection. The user of the second electronic device may perform the network access by the second wireless connection.

In the embodiment of the present disclosure, the type of the second wireless connection is different from that of the first wireless connection. As described in the previous embodiment, the second wireless connection may be a WIFI wireless connection, and the first wireless connection may be a Bluetooth wireless connection.

Figure 2:
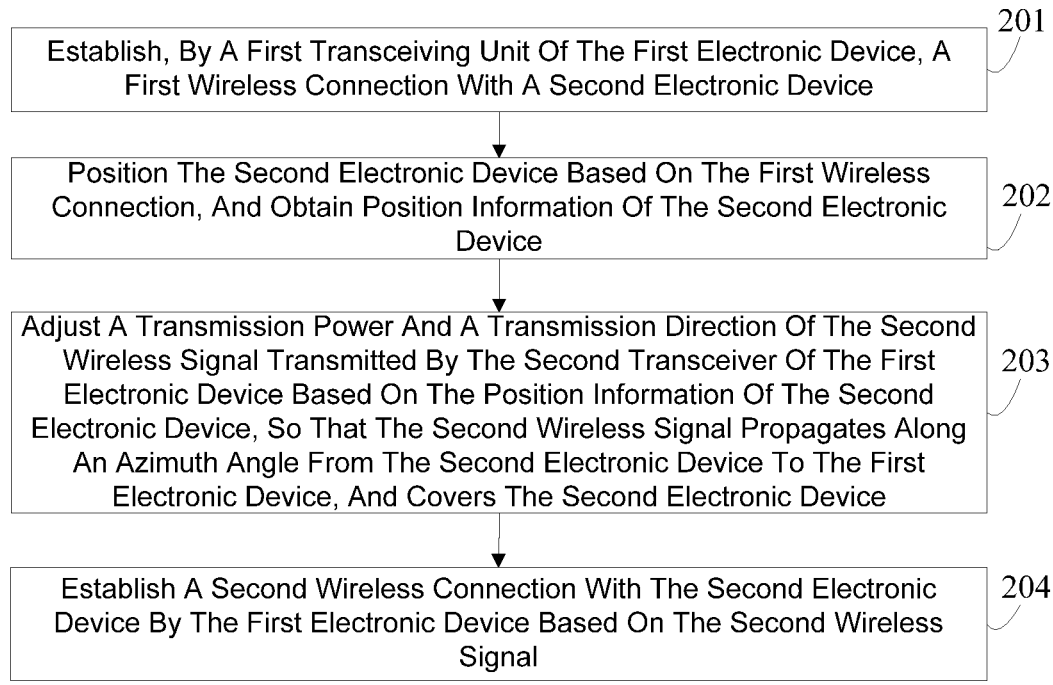
FIG. 2 is an illustrative flowchart of a data processing method according to a second embodiment of the present disclosure.

FIG. 2 is an illustrative flowchart of a data control method according to a second embodiment of the present disclosure.

As shown in FIG. 2, in step 201, the first electronic device establishes a first wireless connection with a second electronic device by a first transceiver of the first electronic device.

In the embodiment of the present disclosure, the first electronic device is an electronic device, such as a router having a radio access function, e.g. a wireless router commonly used today etc. The second electronic device is a user terminal which accesses to the first electronic device wirelessly, such as a mobile terminal, a tablet, a game machine etc.

Each of the first electronic device and the second electronic device is provided with a wireless transceiver for transmitting wireless signals and receiving wireless signals transmitted from other electronic devices. In the embodiment of the present disclosure, each of the first electronic device and the second electronic device is provided with at least two wireless transceivers for supporting at least two radio access approaches.

In step 201, the first electronic device establishes the first wireless connection with the second electronic device by the first transceiver disposed on the first electronic device itself. In the embodiment of the present disclosure, the first wireless connection may be a Bluetooth wireless connection. Power consumption of the Bluetooth wireless connection is relatively low, and coverage of its wireless signal is smaller, but the wireless signal has a less effect on health of the user of the electronic device. Accordingly, the first transceiver may be a Bluetooth antenna system.

In the embodiment of the present disclosure, the Bluetooth connection is only an example of the first wireless connection, but should not be understood as any limitation on the first wireless connection. The first wireless connection may be any of wireless connection approaches.

In step 202, the position of the second electronic device is determined based on the first wireless connection, and position information of the second electronic device is obtained.

After the first electronic device establishes the first wireless connection with the second electronic device by the first transceiver, the second electronic device will be positioned. Particularly, the second electronic device may be positioned using at least one of approaches as follows:

The first transceiver receives the first wireless signal transmitted by the first transceiver of the second electronic device, calculates transmission power of the first wireless signal, and determine a distance between the first electronic device and the second electronic device according to the calculated transmission power; or the first transceiver receives a third wireless signal transmitted by the second electronic device, calculates a time difference between the timing of transmitting the third wireless signal from the second electronic device and the timing of receiving the third wireless signal by the first transceiver, and determines a distance between the first electronic device and the second electronic device according to the time difference; and The first transceiver receives a fourth wireless signal transmitted from the second electronic device, determines a received angle of the fourth wireless signal, and takes the received angle of the fourth wireless signal as an azimuth angle of the second electronic device relative to the first electronic device.

In the embodiment of the present disclosure, the azimuth angle of the second electronic device relative to the first electronic device is determined by a transmission direction of the wireless signal between the first electronic device and the second electronic device; the distance between the first electronic device and the second electronic device is calculated by an attenuation degree of the transmission power of the wireless signal between the first electronic device and the second electronic device; or the distance between the first electronic device and the second electronic device is calculated by calculating a time delay of the wireless signal between the first electronic device and the second electronic device. It should be noted that the methods of calculating the distance and the azimuth angle between the first electronic device and the second electronic device are easy to be implemented, and thus the description thereof will be omitted here for simplicity.

In step 203, a transmission power and a transmission direction of the second wireless signal transmitted by the second transceiver of the first electronic device are adjusted based on the position information of the second electronic device, so that the second wireless signal propagates along an azimuth angle of the second electronic device relative to the first electronic device, and covers the second electronic device In the embodiment of the present disclosure, after the first electronic device establishes the first wireless connection with the second electronic device by the first transceiver, the second wireless connection will be started to establish. In the embodiment of the present disclosure, the second wireless connection may be a WIFI connection. Since the transmission power of a WIFI wireless signal is relatively strong, and the wireless router is generally used in home, the WIFI wireless signal may affect the health of the user to a certain extent. According to the embodiment of the present disclosure, a Bluetooth connection with the accessing electronic device is firstly established by the wireless router; the position information of the second electronic device is determined by the Bluetooth connection; the first electronic device transmits a specific wireless signal to the second electronic device according to the position information of the second electronic device, so that the transmitted wireless signal may be directed to the second electronic device and may cover the second electronic device. The wireless signal of the second transceiver does not cover other orientations than that of the second electronic device. Therefore, when the user of the second electronic device performs a network accesses using WIFI, the WIFI wireless signal is only transmitted towards the second electronic device, but is not radiated in all directions. In addition, in the embodiment of the present disclosure, when the position of the second electronic device is determined, signal strength of the second wireless signal transmitted to the second electronic device may not be of the maximum transmission power, as long as it can cover the second electronic device. Therefore, the transmission strength of the WIFI wireless signal is significantly reduced, and thus less amount of radiation is received by the electronic device, which thereby ensures the user's health.

In the embodiment of the present disclosure, the transmission parameters of the second transceiver to transmit the wireless signal may be adjusted by determining the position information of the second electronic device, ensuring that the second wireless signal is transmitted towards the second electronic device, and the transmission range of the second wireless signal can cover the second electronic device.

In particular, in the embodiment of the present disclosure, after the first wireless connection is established, the second transceiver may adjust the transmission power and the transmission direction of the second wireless signal transmitted by the second transceiver to the second electronic device by means of beamforming according to the position information of the second electronic device, so that the second wireless signal is transmitted to the second electronic device in a narrow region Thus, it is guaranteed that there is no radiation of the second wireless signal to other regions, while the second electronic device establishes the second wireless connection, which ensures the health of the user of the second electronic device.

In step 204, the first electronic device establishes a second wireless connection with the second electronic device by the first electronic device based on the second wireless signal. The type of the second wireless connection is different from that of the first wireless connection.

In the embodiment of the present disclosure, after the second electronic device receives the second wireless signal transmitted by the second transceiver, the second electronic device establishes the second wireless connection with the first electronic device. The second wireless connection may be a WIFI wireless connection. The user of the second electronic device may perform the network access by the second wireless connection.

In the embodiment of the present disclosure, the type of the second wireless connection is different from that of the first wireless connection. As described in the previous embodiment, the second wireless connection may be a WIFI wireless connection, and the first wireless connection may be a Bluetooth wireless connection.

Figure 3:
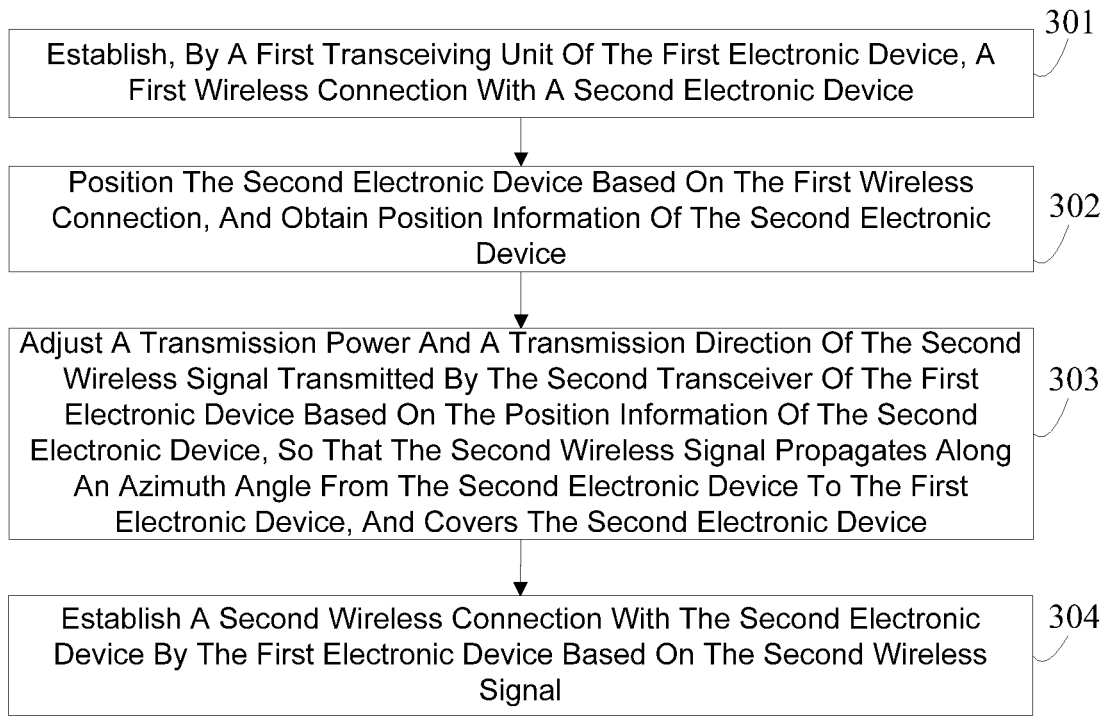
FIG. 3 is an illustrative flowchart of a data processing method according to a third embodiment of the present disclosure.

FIG. 3 is an illustrative flowchart of a data control method according to a third embodiment of the present disclosure.

As shown in FIG. 3, in step 301, the first electronic device establishes a first wireless connection with a second electronic device by a first transceiver of the first electronic device.

In the embodiment of the present disclosure, the first electronic device is an electronic device, such as a router having a radio access function, e.g. a wireless router commonly used today etc. The second electronic device is a user terminal which accesses to the first electronic device wirelessly, such as a mobile terminal, a tablet, a game machine etc.

Each of the first electronic device and the second electronic device is provided with a wireless transceiver for transmitting wireless signals and receiving wireless signals transmitted from other electronic devices. In the embodiment of the present disclosure, each of the first electronic device and the second electronic device is provided with at least two wireless transceivers for supporting at least two radio access approaches.

In step 301, the first electronic device establishes the first wireless connection with the second electronic device by the first transceiver disposed on the first electronic device itself. In the embodiment of the present disclosure, the first wireless connection may be a Bluetooth wireless connection. Power consumption of the Bluetooth wireless connection is relatively low, and coverage of its wireless signal is smaller, but the wireless signal has a less effect on health of the user of the electronic device. Accordingly, the first transceiver may be a Bluetooth antenna system.

In the embodiment of the present disclosure, the Bluetooth connection is only an example of the first wireless connection, but should not be understood as any limitation on the first wireless connection. The first wireless connection may be any of wireless connection approaches.

In step 302, the position of the second electronic device is determined based on the first wireless connection, and position information of the second electronic device is obtained.

After the first electronic device establishes the first wireless connection with the second electronic device by the first transceiver, the second electronic device will be positioned. Particularly, the second electronic device may be positioned using at least one of approaches as follows:

The first transceiver receives the first wireless signal transmitted by the first transceiver of the second electronic device, calculates transmission power of the first wireless signal, and determine a distance between the first electronic device and the second electronic device according to the calculated transmission power; or the first transceiver receives a third wireless signal transmitted by the second electronic device, calculates a time difference between the timing of transmitting the third wireless signal from the second electronic device and the timing of receiving the third wireless signal by the first transceiver, and determines a distance between the first electronic device and the second electronic device according to the time difference; and The first transceiver receives a fourth wireless signal transmitted from the second electronic device, determines a received angle of the fourth wireless signal, and takes the received angle of the fourth wireless signal as an azimuth angle of the second electronic device relative to the first electronic device.

In the embodiment of the present disclosure, the azimuth angle of the second electronic device relative to the first electronic device is determined by a transmission direction of the wireless signal between the first electronic device and the second electronic device; the distance between the first electronic device and the second electronic device is calculated by an attenuation degree of the transmission power of the wireless signal between the first electronic device and the second electronic device; or the distance between the first electronic device and the second electronic device is calculated by calculating a time delay of the wireless signal between the first electronic device and the second electronic device. It should be noted that the methods of calculating the distance and the azimuth angle between the first electronic device and the second electronic device are easy to be implemented, and thus the description thereof will be omitted here for simplicity.

In step 303, a transmission power and a transmission direction of the second wireless signal transmitted by the second transceiver of the first electronic device are adjusted based on the position information of the second electronic device, so that the second wireless signal propagates along an azimuth angle of the second electronic device relative to the first electronic device, and covers the second electronic device In the embodiment of the present disclosure, after the first electronic device establishes the first wireless connection with the second electronic device by the first transceiver, the second wireless connection will be started to establish. In the embodiment of the present disclosure, the second wireless connection may be a WIFI connection. Since the transmission power of a WIFI wireless signal is relatively strong, and the wireless router is generally used in home, the WIFI wireless signal may affect the health of the user to a certain extent. According to the embodiment of the present disclosure, a Bluetooth connection with the accessing electronic device is firstly established by the wireless router; the position information of the second electronic device is determined by the Bluetooth connection; the first electronic device transmits a specific wireless signal to the second electronic device according to the position information of the second electronic device, so that the transmitted wireless signal may be directed to the second electronic device and may cover the second electronic device. The wireless signal of the second transceiver does not cover other orientations than that of the second electronic device. Therefore, when the user of the second electronic device performs a network accesses using WIFI, the WIFI wireless signal is only transmitted towards the second electronic device, but is not radiated in all directions. In addition, in the embodiment of the present disclosure, when the position of the second electronic device is determined, signal strength of the second wireless signal transmitted to the second electronic device may not be of the maximum transmission power, as long as it can cover the second electronic device. Therefore, the transmission strength of the WIFI wireless signal is significantly reduced, and thus less amount of radiation is received by the electronic device, which thereby ensures the user's health.

In the embodiment of the present disclosure, the transmission parameters of the second transceiver to transmit the wireless signal may be adjusted by determining the position information of the second electronic device, ensuring that the second wireless signal is transmitted towards the second electronic device, and the transmission range of the second wireless signal can cover the second electronic device.

In particular, in the embodiment of the present disclosure, after the first wireless connection is established, the second transceiver may adjust the transmission power and the transmission direction of the second wireless signal transmitted by the second transceiver to the second electronic device by means of beamforming according to the position information of the second electronic device, so that the second wireless signal is transmitted to the second electronic device in a narrow region Thus, it is guaranteed that there is no radiation of the second wireless signal to other regions, while the second electronic device establishes the second wireless connection, which ensures the health of the user of the second electronic device.

In step 304, the first electronic device establishes a second wireless connection with the second electronic device by the first electronic device based on the second wireless signal.

The type of the second wireless connection is different from that of the first wireless connection. A maximum transmission power of the first transceiver is less than that of the second transceiver; and a signal transmitting and/or receiving mechanism of the first transceiver is different from that of the second transceiver.

In the embodiment of the present disclosure, the signal transmitting and/or receiving mechanism of the first transceiver is different from that of the second transceiver. That is, the first transceiver may be a Bluetooth antenna system, while the second transceiver may be a WIFI antenna system. The signal transmitting and/or receiving mechanisms of the two transceivers are different, e.g., transmission efficiency of the Bluetooth connection is obviously lower than that of the WIFI connection, and the Bluetooth connection is only adapted for the connection between two devices, while the WIFI connection is adapted for accessing the same wireless router by a plurality of devices.

In the embodiment of the present disclosure, the first electronic device is also provided with the first transceiver for establishing the first wireless connection with the second electronic device. However, a general wireless router is not provided with the first transceiver.

In the embodiment of the present disclosure, after the second electronic device receives the second wireless signal transmitted by the second transceiver, the second electronic device establishes the second wireless connection with the first electronic device. The second wireless connection may be a WIFI wireless connection. The user of the second electronic device may perform the network access by the second wireless connection.

In the embodiment of the present disclosure, the type of the second wireless connection is different from that of the first wireless connection. As described in the previous embodiment, the second wireless connection may be a WIFI wireless connection, and the first wireless connection may be a Bluetooth wireless connection.

Figure 4:
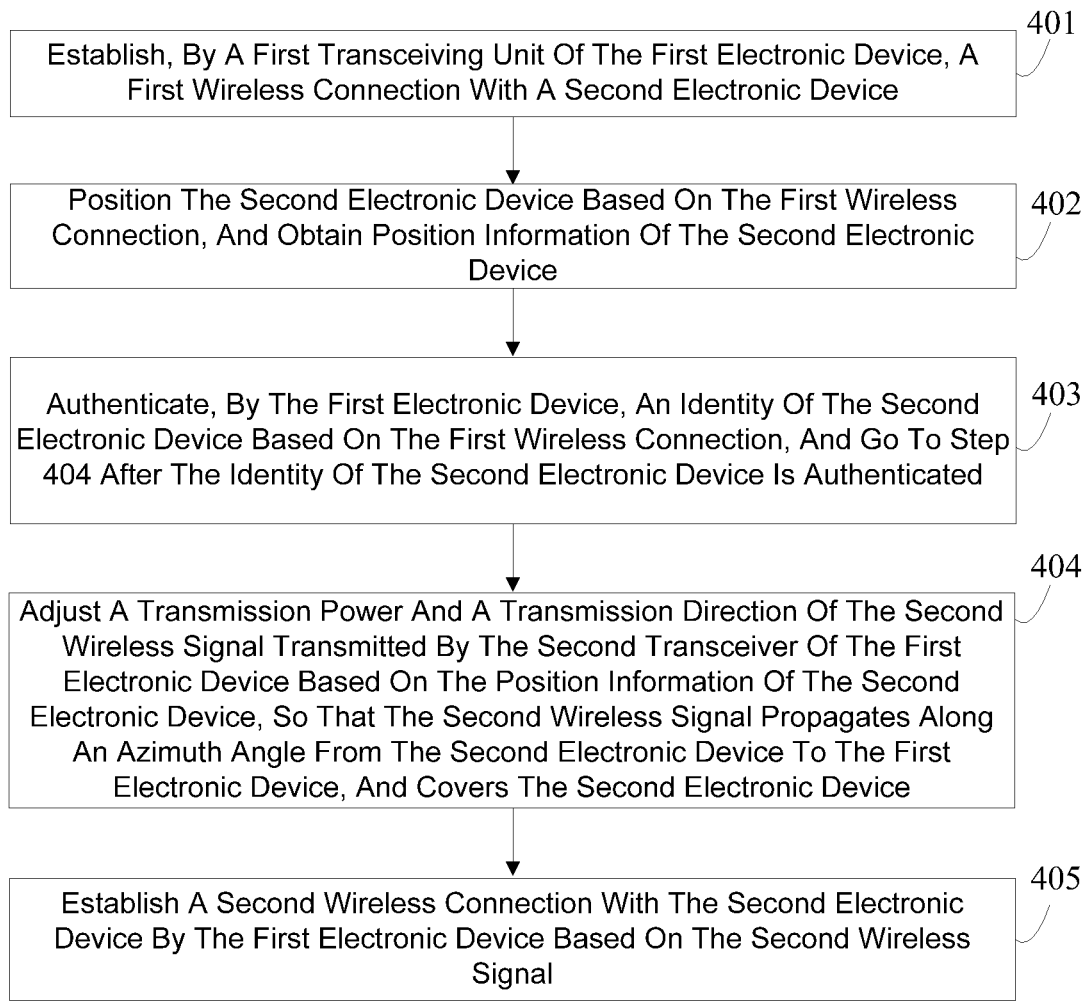
FIG. 4 is an illustrative flowchart of a data processing method according to a fourth embodiment of the present disclosure.

FIG. 4 is an illustrative flowchart of a data control method according to the a fourth embodiment of the present disclosure.

As shown in FIG. 4, in step 401, the first electronic device establishes a first wireless connection with a second electronic device by a first transceiver of the first electronic device.

In the embodiment of the present disclosure, the first electronic device is an electronic device, such as a router having a radio access function, e.g. a wireless router commonly used today etc. The second electronic device is a user terminal which accesses to the first electronic device wirelessly, such as a mobile terminal, a tablet, a game machine etc.

Each of the first electronic device and the second electronic device is provided with a wireless transceiver for transmitting wireless signals and receiving wireless signals transmitted from other electronic devices. In the embodiment of the present disclosure, each of the first electronic device and the second electronic device is provided with at least two wireless transceivers for supporting at least two radio access approaches.

In step 401, the first electronic device establishes the first wireless connection with the second electronic device by the first transceiver disposed on the first electronic device itself. In the embodiment of the present disclosure, the first wireless connection may be a Bluetooth wireless connection. Power consumption of the Bluetooth wireless connection is relatively low, and coverage of its wireless signal is smaller, but the wireless signal has a less effect on health of the user of the electronic device. Accordingly, the first transceiver may be a Bluetooth antenna system.

In the embodiment of the present disclosure, the Bluetooth connection is only an example of the first wireless connection, but should not be understood as any limitation on the first wireless connection. The first wireless connection may be any of wireless connection approaches.

The step 401 of establishing, by the first transceiver of the first electronic device, the first wireless connection with the second electronic device particularly comprises: authenticating an identity of the second electronic device after the first transceiver detects an access request transmitted by the second electronic device, and establishing the first wireless connection after the identity of the second electronic device is authenticated; or transmitting identification information of the first electronic device to the second electronic device after the first transceiver detects an access request transmitted by the second electronic device, wherein the second electronic device authenticates an identity of the first electronic device based on the identification information of the first electronic device, and establishes the first wireless connection after the identity of the first electronic device is authenticated.

As will be understood by the skilled in the art, it is easy for the two electronic devices to establish the Bluetooth connection by providing the Bluetooth wireless signal through Bluetooth devices of their own. Thus, the description of the first wireless connection will not be discussed here for simplicity.

In step 402, the position of the second electronic device is determined based on the first wireless connection, and position information of the second electronic device is obtained.

After the first electronic device establishes the first wireless connection with the second electronic device by the first transceiver, the second electronic device will be positioned. Particularly, the second electronic device may be positioned using at least one of approaches as follows:

The first transceiver receives the first wireless signal transmitted by the first transceiver of the second electronic device, calculates transmission power of the first wireless signal, and determine a distance between the first electronic device and the second electronic device according to the calculated transmission power; or the first transceiver receives a third wireless signal transmitted by the second electronic device, calculates a time difference between the timing of transmitting the third wireless signal from the second electronic device and the timing of receiving the third wireless signal by the first transceiver, and determines a distance between the first electronic device and the second electronic device according to the time difference; and The first transceiver receives a fourth wireless signal transmitted from the second electronic device, determines a received angle of the fourth wireless signal, and takes the received angle of the fourth wireless signal as an azimuth angle of the second electronic device relative to the first electronic device.

In the embodiment of the present disclosure, the azimuth angle of the second electronic device relative to the first electronic device is determined by a transmission direction of the wireless signal between the first electronic device and the second electronic device; the distance between the first electronic device and the second electronic device is calculated by an attenuation degree of the transmission power of the wireless signal between the first electronic device and the second electronic device; or the distance between the first electronic device and the second electronic device is calculated by calculating a time delay of the wireless signal between the first electronic device and the second electronic device. It should be noted that the methods of calculating the distance and the azimuth angle between the first electronic device and the second electronic device are easy to be implemented, and thus the description thereof will be omitted here for simplicity.

In step 403, the first electronic device authenticates the identity of the second electronic device for the second wireless connection based on the first wireless connection, and performs step 404 after the identity of the second electronic device is authenticated.

In the embodiment of the present disclosure, after the first wireless connection is established, the second electronic device will transmit a request for identity authentication to the first electronic device, the request for identity authentication being a request for identity authentication related to the second wireless connection, i.e., confirming whether the second electronic device has a qualification of establishing the second wireless connection. Only if the identity of the second electronic device is authenticated, the second transceiver transmits to the second electronic device the second wireless signal with the adjusted transmission parameters.

In step 404, a transmission power and a transmission direction of the second wireless signal transmitted by the second transceiver of the first electronic device are adjusted based on the position information of the second electronic device, so that the second wireless signal propagates along an azimuth angle of the second electronic device relative to the first electronic device, and covers the second electronic device In the embodiment of the present disclosure, after the first electronic device establishes the first wireless connection with the second electronic device by the first transceiver, the second wireless connection will be started to establish. In the embodiment of the present disclosure, the second wireless connection may be a WIFI connection. Since the transmission power of a WIFI wireless signal is relatively strong, and the wireless router is generally used in home, the WIFI wireless signal may affect the health of the user to a certain extent. According to the embodiment of the present disclosure, a Bluetooth connection with the accessing electronic device is firstly established by the wireless router; the position information of the second electronic device is determined by the Bluetooth connection; the first electronic device transmits a specific wireless signal to the second electronic device according to the position information of the second electronic device, so that the transmitted wireless signal may be directed to the second electronic device and may cover the second electronic device. The wireless signal of the second transceiver does not cover other orientations than that of the second electronic device. Therefore, when the user of the second electronic device performs a network accesses using WIFI, the WIFI wireless signal is only transmitted towards the second electronic device, but is not radiated in all directions. In addition, in the embodiment of the present disclosure, when the position of the second electronic device is determined, signal strength of the second wireless signal transmitted to the second electronic device may not be of the maximum transmission power, as long as it can cover the second electronic device. Therefore, the transmission strength of the WIFI wireless signal is significantly reduced, and thus less amount of radiation is received by the electronic device, which thereby ensures the user's health.

In the embodiment of the present disclosure, the transmission parameters of the second transceiver to transmit the wireless signal may be adjusted by determining the position information of the second electronic device, ensuring that the second wireless signal is transmitted towards the second electronic device, and the transmission range of the second wireless signal can cover the second electronic device.

In particular, in the embodiment of the present disclosure, after the first wireless connection is established, the second transceiver may adjust the transmission power and the transmission direction of the second wireless signal transmitted by the second transceiver to the second electronic device by means of beamforming according to the position information of the second electronic device, so that the second wireless signal is transmitted to the second electronic device in a narrow region Thus, it is guaranteed that there is no radiation of the second wireless signal to other regions, while the second electronic device establishes the second wireless connection, which ensures the health of the user of the second electronic device.

In step 405, the first electronic device establishes a second wireless connection with the second electronic device by the first electronic device based on the second wireless signal. The type of the second wireless connection is different from that of the first wireless connection.

In the embodiment of the present disclosure, after the second electronic device receives the second wireless signal transmitted by the second transceiver, the second electronic device establishes the second wireless connection with the first electronic device. The second wireless connection may be a WIFI wireless connection. The user of the second electronic device may perform the network access by the second wireless connection.

In the embodiment of the present disclosure, the type of the second wireless connection is different from that of the first wireless connection. As described in the previous embodiment, the second wireless connection may be a WIFI wireless connection, and the first wireless connection may be a Bluetooth wireless connection.

Figure 5:
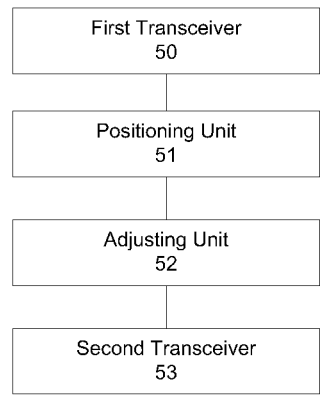
FIG. 5 is a schematic diagram of a structure of an electronic device according to an embodiment of the present disclosure.

FIG. 5 is a schematic diagram of a structure of an electronic device according to an embodiment of the present disclosure. As shown in FIG. 5, the electronic device according to an embodiment of the present disclosure comprises: a first transceiver 50, a positioning unit 51, an adjusting unit 52 and a second transceiver 53, in which the first transceiver 50 is configured to transmit and/or receive a first wireless signal, and to establish a first wireless connection with a second electronic device;

the positioning unit 51 is configured to position the second electronic device based on the first wireless connection, so as to obtain position information of the second electronic device;

the adjusting unit 52 is configured to adjust transmission parameters of the second transceiver to transmit a second wireless signal based on the position information of the second electronic device, so that the second transceiver transmits the second wireless signal to the second electronic device in a predetermined way; and the second transceiver 53 is configured to transmit the second wireless signal, and to establish a second wireless connection with the second electronic device based on the second wireless signal, a type of the second wireless connection being different from that of the first wireless connection.

In the embodiment of the present disclosure, the first electronic device is an electronic device, such as a router having a radio access function, e.g. a wireless router commonly used today etc. The second electronic device is a user terminal which accesses to the first electronic device wirelessly, such as a mobile terminal, a tablet, a game machine etc.

In the embodiment of the present disclosure, the adjusting unit 52 further adjusts a transmission power and a transmission direction of the second wireless signal transmitted by the second transceiver based on the position information of the second electronic device, so that the second wireless signal propagates along an azimuth angle of the second electronic device relative to the first electronic device, and covers the second electronic device.

In the embodiment of the present disclosure, after the first electronic device establishes the first wireless connection with the second electronic device by the first transceiver, the second wireless connection will be started to establish. In the embodiment of the present disclosure, the second wireless connection may be a WIFI connection. Since the transmission power of a WIFI wireless signal is relatively strong, and the wireless router is generally used in home, the WIFI wireless signal may affect the health of the user to a certain extent. According to the embodiment of the present disclosure, a Bluetooth connection with the accessing electronic device is firstly established by the wireless router; the position information of the second electronic device is determined by the Bluetooth connection; the first electronic device transmits a specific wireless signal to the second electronic device according to the position information of the second electronic device, so that the transmitted wireless signal may be directed to the second electronic device and may cover the second electronic device. The wireless signal of the second transceiver does not cover other orientations than that of the second electronic device. Therefore, when the user of the second electronic device performs a network accesses using WIFI, the WIFI wireless signal is only transmitted towards the second electronic device, but is not radiated in all directions. In addition, in the embodiment of the present disclosure, when the position of the second electronic device is determined, signal strength of the second wireless signal transmitted to the second electronic device may not be of the maximum transmission power, as long as it can cover the second electronic device. Therefore, the transmission strength of the WIFI wireless signal is significantly reduced, and thus less amount of radiation is received by the electronic device, which thereby ensures the user's health.

In the embodiment of the present disclosure, a maximum transmission power of the first transceiver 50 is less than that of the second transceiver 53; and a signal transmitting and/or receiving mechanism of the first transceiver 50 is different from that of the second transceiver 53.

In the embodiment of the present disclosure, the first transceiver 50 is further configured to authenticate an identity of the second electronic device after detecting an access request transmitted by the second electronic device, and to establish the first wireless connection after the identity of the second electronic device is authenticated; or the first transceiver 50 is further configured to transmit identification information of the first electronic device to the second electronic device after detecting an access request transmitted by the second electronic device, wherein the second electronic device authenticates an identity of the first electronic device based on the identification information of the first electronic device, and establishes the first wireless connection after the identity of the first electronic device is authenticated.

Based on the electronic device shown in FIG. 5, the electronic device according to the embodiment of the present disclosure further comprises:

an authentication unit (not shown in FIG. 5), configured to authenticate the identity of the second electronic device for the second wireless connection based on the first wireless connection; and to trigger the adjusting unit to adjust the transmission parameters of the second transceiver of the first electronic device to transmit the second wireless signal after the identity of the second electronic device is authenticated, so that the second transceiver transmits the second wireless signal to the second electronic device in the predetermined way.

It should be understood by the skilled in the art that functions of various units in the electronic device as shown in FIG. 5 may be understood with reference to descriptions of the signal processing method as previously discussed. The functions of various units in the electronic device as shown in FIG. 5 may be implemented by programs running on a processor, and may also be implemented by a particular logic circuit.

The technical solutions of the embodiments according to the present disclosure may be combined in any form in a condition that they are not conflicted with each other.

It can be appreciated from the embodiments of the present disclosure that the disclosed device and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

In addition, various functional units in the embodiments of the present disclosure may be all integrated into a second processing unit, or various functional units are separately used as one unit, or two or more units are integrated into one unit; the integrated units as previously described may be implemented in hardware or a combination of hardware and software functional units.

While the embodiments of the present disclosure have been described above, the scope of the present disclosure is not limited thereto. Various modifications and alternatives can be made by those skilled in the art without departing from the scope of the present disclosure. These modifications and alternatives are to be encompassed by the scope of the present disclosure which is only defined by the claims as attached.

We claim:

1. A data processing method applied to a first electronic device, comprising:
   performing a first identity authentication for a first wireless connection with a second electronic device bidirectionally or unidirectionally after a first transceiver of the first electronic device detects an access request transmitted by the second electronic device;
   transmitting a first wireless signal and establishing, by the first transceiver of the first electronic device, the first wireless connection with the second electronic device based on the first wireless signal when the first identity authentication is successful;
   positioning the second electronic device based on the first wireless connection, so as to obtain position information of the second electronic device;
   performing a second identity authentication for a second wireless connection with the second electronic device based on the first wireless connection;
   when the second identity authentication is successful, determining, based on the position information of the second electronic device, a transmission power and a transmission direction of a second transceiver of the first electronic device to transmit a second wireless signal, wherein the second wireless signal propagates a limited distance along an azimuth angle of the second electronic device relative to the first electronic device, the transmission power of the second transceiver of the first electronic device is determined to be enough to cover the second electronic device, the transmission power of the second wireless signal is less than a maximum transmission power of the second transceiver, a maximum transmission power of the first transceiver is less than the maximum transmission power of the second transceiver, and a maximum coverage area of the first transceiver is less than a maximum coverage area of the second transceiver; and
   establishing the second wireless connection with the second electronic device by the first electronic device based on the second wireless signal to enable the second electronic device to perform a network access by the second wireless connection,
   wherein the first electronic device comprises a wireless router, the first wireless connection comprises a point-to-point Bluetooth connection, the second electronic device comprises a user terminal, and the second wireless connection comprises a WiFi connection.

2. The data processing method of claim 1, wherein a signal transmitting and/or receiving mechanism of the first transceiver is different from that of the second transceiver.

3. The data processing method of claim 1, wherein the performing an identity authentication with a second electronic device bidirectionally or unidirectionally comprises:
   authenticating an identity of the second electronic device, wherein the identity authentication is successful when the identity of the second electronic device is authenticated; or
   transmitting identification information of the first electronic device to the second electronic device, wherein the second electronic device authenticates an identity of the first electronic device based on the identification information of the first electronic device, and the identity authentication is successful when the identity of the first electronic device is authenticated.

4. The data processing method of claim 3, wherein after the first wireless connection is established, the method further comprises:
   authenticating, by the first electronic device, the identity of the second electronic device for the second wireless connection based on the first wireless connection; and
   adjusting the transmission power and the transmission direction of the second transceiver to transmit the second wireless signal after the identity of the second electronic device is authenticated, so that the second wireless signal propagates along an azimuth angle of the second electronic device relative to the first electronic device, and covers the second electronic device.

5. An electronic device having a first transceiver and a second transceiver, comprising:
   a processor, and
   a memory storing instructions, wherein the instructions when executed by the processor cause the processor to:
   perform a first identity authentication for a first wireless connection with a second electronic device bidirectionally or unidirectionally after the first transceiver detects an access request transmitted by the second electronic device;
   control the first transceiver to transmit the first wireless signal, and establish a first wireless connection with the second electronic device based on the first wireless signal when the first identity authentication is successful;
   position the second electronic device based on the first wireless connection, so as to obtain position information of the second electronic device;
   perform a second identity authentication for a second wireless connection with the second electronic device based on the first wireless connection;
   when the second identity authentication is successful, determine, based on the position information of the second electronic device, a transmission power and a transmission direction of the second transceiver transmitting a second wireless signal, so that the second wireless signal propagates a limited distance along an azimuth angle of the second electronic device relative to the electronic device, and covers the second electronic device, wherein the determined transmission power of the second transceiver is less than a maximum transmission power of the second transceiver, as long as the determined transmission power of the second transceiver is able to make the second wireless signal cover the second electronic device, a maximum transmission power of the first transceiver is less than the maximum transmission power of the second transceiver, and a maximum coverage area of the first transceiver is less than a maximum coverage area of the second transceiver; and control the second transceiver to transmit the second wireless signal, and establish the second wireless connection with the second electronic device based on the second wireless signal to enable the second electronic device to perform a network access by the second wireless connection, wherein the electronic device comprises a wireless router, the first wireless connection comprises a point-to-point Bluetooth connection, the second electronic device comprises a user terminal, and the second wireless connection comprises a WiFi connection.

6. The electronic device of claim 5, wherein a signal transmitting and/or receiving mechanism of the first transceiver is different from that of the second transceiver.

7. The electronic device of claim 5, wherein the processor is configured to authenticate an identity of the second electronic device after detecting an access request transmitted by the second electronic device, and wherein the identity authentication is successful when the identity of the second electronic device is authenticated; or the processor is further configured to control the first transceiver to transmit identification information of the electronic device to the second electronic device after detecting an access request transmitted by the second electronic device, wherein the second electronic device authenticates an identity of the electronic device based on the identification information of the electronic device, and wherein the identity authentication is successful when the identity of the electronic device is authenticated.

8. The electronic device of claim 7, wherein the processor is further configured to:

authenticate the identity of the second electronic device for the second wireless connection based on the first wireless connection; and adjust the transmission power and the transmission direction of the second transceiver to transmit the second wireless signal after the identity of the second electronic device is authenticated, so that the second wireless signal propagates along an azimuth angle of the second electronic device relative to the electronic device, and covers the second electronic device.

* * * * *